US010737392B2

(12) United States Patent
Yamamoto et al.

(10) Patent No.: US 10,737,392 B2
(45) Date of Patent: Aug. 11, 2020

(54) AUTONOMOUS MOBILE OBJECT AND STORAGE MEDIUM FOR AUTONOMOUS MOBILE OBJECT

(71) Applicant: TOYOTA JIDOSHA KABUSHIKI KAISHA, Toyota-shi, Aichi-ken (JP)

(72) Inventors: Kazuya Yamamoto, Toyota (JP); Yoshihiro Okumatsu, Nagakute (JP); Ui Yamaguchi, Toyota (JP); Masatomo Tanaka, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 387 days.

(21) Appl. No.: 15/799,333

(22) Filed: Oct. 31, 2017

(65) Prior Publication Data
US 2018/0126560 A1 May 10, 2018

(30) Foreign Application Priority Data
Nov. 8, 2016 (JP) ................................ 2016-218351

(51) Int. Cl.
*B25J 19/00* (2006.01)
*B25J 9/16* (2006.01)
(Continued)

(52) U.S. Cl.
CPC ............. *B25J 9/1697* (2013.01); *B08B 1/005* (2013.01); *B08B 5/02* (2013.01); *B25J 5/007* (2013.01);
(Continued)

(58) Field of Classification Search
CPC ........ B25J 9/1697; B25J 5/007; B25J 19/005; B25J 9/162; B25J 19/02; B25J 11/0085;
(Continued)

(56) References Cited

U.S. PATENT DOCUMENTS 8,466,583 B2 * 6/2013 Karalis ................... H02J 50/70
307/104
8,907,531 B2 * 12/2014 Hall ....................... H02J 50/60
307/326
(Continued)

FOREIGN PATENT DOCUMENTS

JP 2003-240518 A 8/2003
JP 2004-111674 A 4/2004
(Continued)

*Primary Examiner* — Ian Jen
(74) *Attorney, Agent, or Firm* — Sughrue Mion, PLLC

(57) ABSTRACT

An autonomous mobile object includes: a moving mechanism; a power-receiving terminal that is supplied with power from a power-supply terminal; an imaging unit configured to image the power-supply terminal at a position separated from the power-supply terminal by more than a distance at which the power-receiving terminal is capable of being supplied with power from the power-supply terminal; a determination unit configured to determine whether to remove contamination of the power-supply terminal based on an analysis result obtained by analyzing the image captured by the imaging unit and information on misalignment between the power-supply terminal and the power-receiving terminal, the misalignment being predicted when the autonomous mobile object moves to a position at which the power-receiving terminal is capable of being supplied with power from the power-supply terminal; and a removal unit configured to remove the contamination when the determination unit determines to remove the contamination.

9 Claims, 8 Drawing Sheets

(51) Int. Cl.
  *B25J 5/00* (2006.01)
  *B60L 53/36* (2019.01)
  *G05D 1/02* (2020.01)
  *B60L 53/14* (2019.01)
  *B60L 53/37* (2019.01)
  *B08B 1/00* (2006.01)
  *B08B 5/02* (2006.01)
  *G08B 7/06* (2006.01)

(52) U.S. Cl.
  CPC ............ *B25J 19/005* (2013.01); *B60L 53/14* (2019.02); *B60L 53/36* (2019.02); *B60L 53/37* (2019.02); *G05D 1/0225* (2013.01); *G05D 1/0246* (2013.01); *B25J 9/162* (2013.01); *B60L 2200/40* (2013.01); *G05B 2219/45082* (2013.01); *G05B 2219/45098* (2013.01); *G08B 7/06* (2013.01); *Y10S 901/01* (2013.01); *Y10S 901/44* (2013.01)

(58) Field of Classification Search
  CPC .. B25J 9/16; B60L 53/37; B60L 53/14; B60L 53/36; B60L 2200/40; G05D 1/0225; G05D 1/0246; B08B 5/02; B08B 1/005; G05B 2219/45098; G05B 2219/45082; Y10S 901/44; Y10S 901/01; G08B 7/06; A47L 11/40
  See application file for complete search history.

(56) References Cited

U.S. PATENT DOCUMENTS

| | | | | |
|---|---|---|---|---|
| 8,928,276 | B2* | 1/2015 | Kesler | H02J 50/70 320/108 |
| 8,933,594 | B2* | 1/2015 | Kurs | B60L 53/122 307/326 |

FOREIGN PATENT DOCUMENTS

| | | |
|---|---|---|
| JP | 2005-087873 A | 4/2005 |
| JP | 2009-038880 A | 2/2009 |
| JP | 2013-234799 A | 11/2013 |
| JP | 2014-094233 A | 5/2014 |

* cited by examiner

PREDICTED CONTACT PROPORTION (%)

| DEGREE OF LATERAL MISALIGNMENT g (mm) / STRAIGHT FORWARD DISTANCE D (mm) | 0-5 | 5-10 | 10-15 | 15-20 |
|---|---|---|---|---|
| $D_0-20 \sim D_0-10$ | 80 | 70 | 60 | 50 |
| $D_0-10 \sim D_0+10$ | 90 | 80 | 70 | 60 |
| $D_0+10 \sim D_0+20$ | 85 | 75 | 65 | 55 |
| $D_0+20 \sim D_0+30$ | 80 | 70 | 60 | 50 |

FIG. 9

DUST COEFFICIENT TABLE

| DUST OCCUPANCY RATE (%) | 0-2 | 2-10 | 10-15 | 15- |
|---|---|---|---|---|
| COEFFICIENT $k_1$ | 1.0 | 0.9 | 0.7 | 0.5 |

FIG. 10

OXIDIZATION COEFFICIENT TABLE

| DEGREE OF OXIDIZATION PROGRESS (%) | 0-5 | 5-10 | 10-15 | 15- |
|---|---|---|---|---|
| COEFFICIENT $k_2$ | 1.0 | 0.9 | 0.7 | 0.5 |

AUTONOMOUS MOBILE OBJECT AND STORAGE MEDIUM FOR AUTONOMOUS MOBILE OBJECT

INCORPORATION BY REFERENCE

The disclosure of Japanese Patent Application No. 2016-218351 filed on Nov. 8, 2016 including the specification, drawings and abstract is incorporated herein by reference in its entirety.

BACKGROUND

1. Technical Field

The disclosure relates to an autonomous mobile object and a storage medium for an autonomous mobile object.

2. Description of Related Art

A mobile robot that has a battery mounted therein and moves autonomously is known. For example, an autonomous mobile vacuum cleaning device described in Japanese Patent Application Publication No. 2014-94233 (JP 2014-94233 A) returns to a charging stand and automatically starts charging of a battery.

SUMMARY

When the vacuum cleaning device described in JP 2014-94233 A has returned to the charging stand, dust attached to a charging terminal is removed with wind from an electric blower disposed in the charging stand. When a power-receiving terminal of an autonomous mobile object is brought into contact with, for example, a power-supply terminal connected to a domestic AC power source to charge the battery of the autonomous mobile object, appropriate charging may not be carried out due to contamination such as dust interposed between the power-supply terminal and the power-receiving terminal. However, performing removal work for every charging as in the vacuum cleaning device described in JP 2014-94233 A is not preferable in view of power required for the removal work or time required until completion of charging. Since the power-receiving terminal is brought into contact with the power-supply terminal by autonomous movement, there is a problem specific to the autonomous mobile object in that appropriate charging cannot be carried out due to misalignment between the terminals as well as contamination between the terminals.

The disclosure provides an autonomous mobile object and a storage medium for an autonomous mobile object that can satisfactorily charge a battery without consuming excessive power and shorten a charging time than in the related art.

According to a first aspect of the disclosure, there is provided an autonomous mobile object including: a moving mechanism that is used for the autonomous mobile object to move autonomously; a power-receiving terminal that is supplied with power from a power-supply terminal located outside the autonomous mobile object; an imaging unit configured to image the power-supply terminal at a position separated from the power-supply terminal by more than a distance at which the power-receiving terminal is capable of being supplied with power from the power-supply terminal; a determination unit configured to determine whether to remove contamination of the power-supply terminal based on an analysis result obtained by analyzing the image captured by the imaging unit and information on misalignment between the power-supply terminal and the power-receiving terminal, the misalignment being predicted when the autonomous mobile object moves to a position at which the power-receiving terminal is capable of being supplied with power from the power-supply terminal using the moving mechanism; and a removal unit configured to remove the contamination when the determination unit determines to remove the contamination.

According to this configuration, it is possible to determine whether to remove contamination of the power-supply terminal in advance and to perform removal work only if necessary. Accordingly, when it is not necessary to remove contamination, it is possible to save time and power required for the removal work.

In the first aspect of the disclosure, the determination unit may be configured to perform the determination using an evaluation function of increasing a likelihood of determination to remove the contamination as the predicted misalignment between the power-supply terminal and the power-receiving terminal increases.

In the first aspect of the disclosure, the determination unit may be configured to specify a type of the contamination based on the image, and the removal unit may be configured to change a tool that is used to remove the contamination depending on the specified type.

In the first aspect of the disclosure, the autonomous mobile object may further include a robot hand configured to grip a work object of work that is performed by the autonomous mobile object and the robot hand may be used as at least a part of the removal unit to remove the contamination.

In the first aspect of the disclosure, the information on the misalignment may be stored in a storage unit as a database indicating a predicted contact proportion between the power-supply terminal and the power-receiving terminal. The database may be prepared depending on a relative position of the autonomous mobile object to the power-supply terminal.

In the first aspect of the disclosure, the determination unit may be configured to determine whether to remove the contamination of the power-supply terminal based on the predicted contact proportion between the power-supply terminal and the power-receiving terminal that is extracted from the information on the misalignment and a degree of deterioration in power supply efficiency due to the contamination that is analyzed from the image.

In the first aspect of the disclosure, the autonomous mobile object may further include a warning unit configured to issue a warning to a user when power supply work performed after the removal unit removes the contamination fails.

In the first aspect of the disclosure, the imaging unit may be a part of an environment sensor that acquires surrounding environment information for autonomous movement.

According to a second aspect of the disclosure, there is provided a computer-readable storage medium for an autonomous mobile object, the storage medium storing a computer program and causing a computer to perform, when the computer program is executed: an imaging step of imaging a power-supply terminal located outside the autonomous mobile object in a state in which a power-receiving terminal that is supplied with power from the power-supply terminal is at a position separated from the power-supply terminal by more than a distance at which the power-receiving terminal is capable of being supplied with power from the power-supply terminal; an analysis step of analyzing the image captured in the imaging step; a calculation step of calculating an amount of misalignment between the power-supply terminal and the power-receiving terminal, the misalignment being predicted when the autonomous mobile object moves to a position at which the power-receiving terminal is capable of being supplied with power from the power-supply terminal; a determination step of determining whether to remove contamination of the power-supply terminal based on the analysis result in the analysis step and the amount of misalignment calculated in the calculation step; and a removal step of removing the contamination when it is determined in the determination step to remove the contamination.

By performing these steps, it is possible to determine whether to remove contamination of the power-supply terminal in advance and to perform removal work only if necessary. Accordingly, when it is not necessary to remove contamination, it is possible to save time and power required for the removal work.

According to the disclosure, it is possible to provide an autonomous mobile object and a storage medium for an autonomous mobile object that can satisfactorily charge a battery without consuming excessive power and shorten a charging time than in the related art.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 9 is a table illustrating a dust coefficient acquired by digitizing an influence of dust to charging;

FIG. 10 is a table illustrating an oxidization coefficient acquired by digitizing an influence of oxidization to charging.

DETAILED DESCRIPTION OF EMBODIMENTS

Hereinafter, an embodiment of the disclosure will be described, but the disclosure associated with the appended claims is not limited to the following embodiment. All elements of a configuration described in the embodiment cannot be said to be essential to means for solving a problem.

Figure 1:
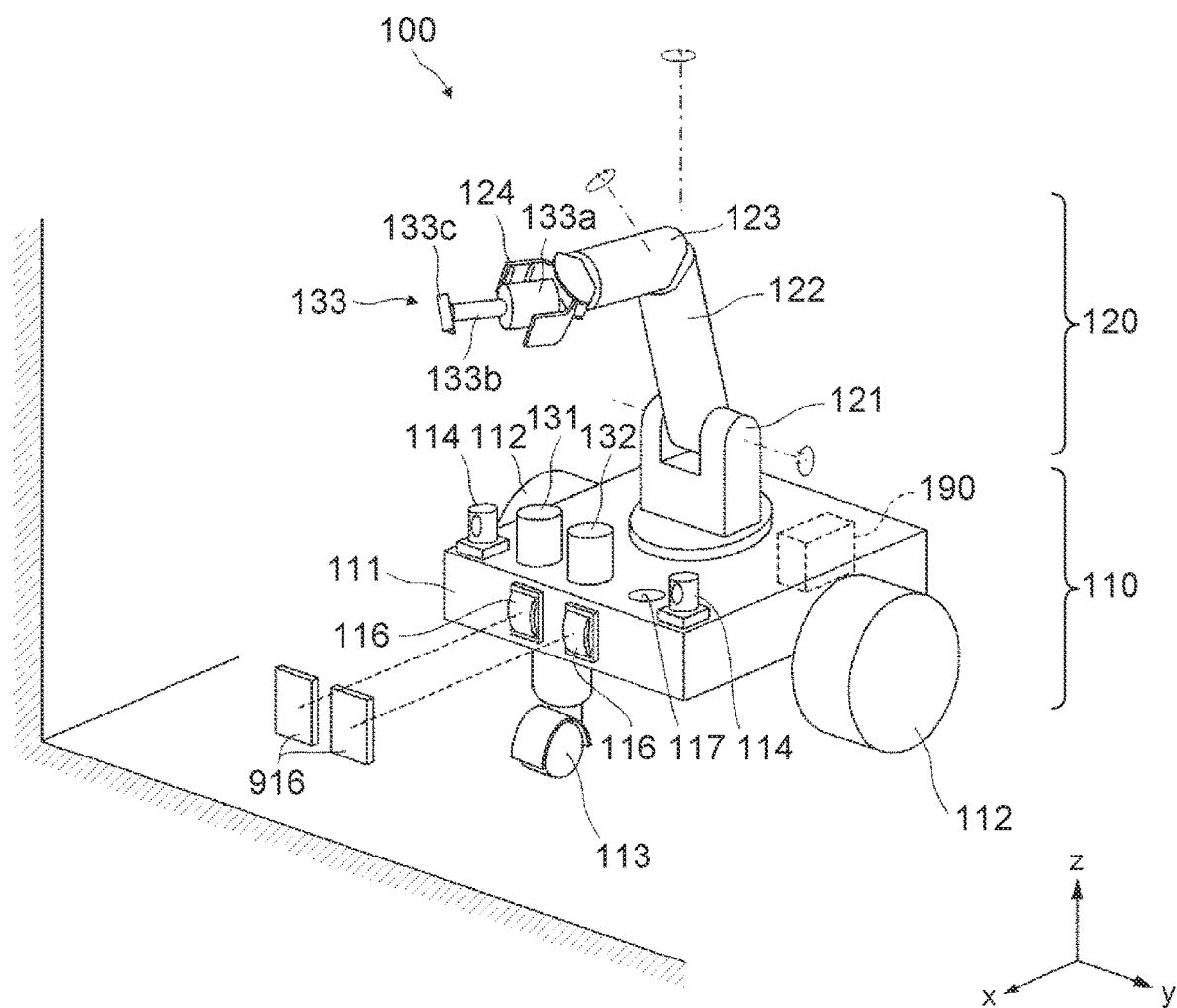
FIG. 1 is an external perspective view of a mobile robot according to an embodiment.

FIG. 1 is an external perspective view of a mobile robot 100 that is an autonomous mobile object according to an embodiment. The mobile robot 100 includes a carriage 110 and a gripper 120.

The carriage 110 mainly includes a base 111 and two driving wheels 112 and a caster 113 which are attached to the base 111. The two driving wheels 112 are disposed on opposite sides of the base 111 such that rotating shafts thereof match each other. The driving wheels 112 are rotationally driven by motors which are not illustrated. The caster 113 is a driven wheel, is disposed such that a pivot extending in a vertical direction from the base 111 is separated from the rotating shaft of the wheel and supports the wheel, and moves in a moving direction of the carriage 110 to follow the carriage. For example, the mobile robot 100 moves straightly when the two driving wheels 112 rotate in the same direction at the same rotation speed, and turns around a vertical axis passing through the center of gravity thereof when the two driving wheels rotate in the opposite directions at the same rotation speed. That is, the mobile robot 100 can move forward or backward or turn by controlling the rotation directions and the rotation speeds of the two driving wheels 112.

Various sensors for detecting obstacles or recognizing a surrounding environment are provided on the carriage 110. A camera 114 is one of the sensors and two cameras are disposed on the front side of the base 111. The camera 114 includes, for example, a CMOS image sensor and transmits a captured image signal to a control unit which will be described later. When the two cameras 114 image the same subject, a parallax image can be acquired and distance to the subject can also be calculated.

Two power-receiving terminals 116 are disposed to slightly protrude on the front surface of the base 111. The power-receiving terminals 116 are brought into contact with power-supply terminals 916 disposed on a wall surface of a movement space of the mobile robot 100 and are supplied with power therefrom. The power-receiving terminal 116 employs a conductive leaf spring which is formed in a shape convex to the power-supply terminal and which is deformed to follow the surface of the power-supply terminal when the power-receiving terminal is pressed against the power-supply terminal 916. The power-supply terminals 916 are connected to a domestic AC power source or the like.

Three storage holes 117 that store removal tools for removing contamination of the power-supply terminals 916 are formed in the top surface of the base 111, and a blower 131 and a sander 132 as the removal tools are stored in two storage holes thereof in the drawing. A wiper 133 stored in one storage hole 117 is pulled out and is gripped by a hand 124 which will be described later. As illustrated in the drawing, the wiper 133 includes a grip 133a which is a part gripped by the hand 124, a shaft 133b which extends from the grip 133a, and a blade 133c which is disposed in a tip of the shaft 133b. The wiper 133 is a removal tool for sweeping and removing a water droplet as contamination of the power-supply terminals 916 from the power-supply terminals 916.

Each of the blower 131 and the sander 132 includes a grip and a shaft, an outlet of compressed air is formed at the tip of the shaft of the blower 131, and a grinding portion is formed at the tip of the shaft of the sander 132. The blower 131 is a removal tool for blowing out and removing dust as contamination of the power-supply terminals 916 from the power-supply terminals 916. The sander 132 is a removal tool for grinding off and removing an oxide film as contamination of the power-supply terminals 916 from the power-supply terminals 916. In the drawing, the tips of the shafts are hidden in the storage holes 117.

A battery 190 is a secondary battery which is housed in the base 111 and is, for example, a nickel-hydride secondary battery. The battery 190 supplies power to elements of the mobile robot 100. When the power-receiving terminals 116 are supplied with power from the power-supply terminals 916, the battery 190 is charged.

The gripper 120 includes a plurality of arms 121, 122, and 123 and a hand 124. One end of the arm 121 is supported by the base 111 to be rotatable about a vertical axis, one end of the arm 122 is supported by the other end of the arm 121 to be rotatable about a horizontal axis. One end of the arm 123 is supported by the other end of the arm 122 to be rotatable in a radial direction from the other end of the arm 122. The hand 124 is supported by the other end of the arm 123 to be rotatable about an axis parallel to the extending direction of the arm 123.

The hand 124 includes a gripping mechanism to grip a conveyance object as a work object of the mobile robot 100. The mobile robot 100 is not limited to conveyance of the conveyance object but can be used for various purposes. The gripper 120 can grip various work objects depending on the purposes of the mobile robot 100. For example, the gripper may perform an operation of gripping and rotating a lever to open a door.

The gripper 120 performs a function of a removal unit that performs a removal operation of removing contamination of the power-supply terminals 916. Specifically, by causing the hand 124 to grip a removal tool and causing the arms to operate appropriately, the removal tool sweeps the surface of the power-supply terminals 916.

Figure 2:
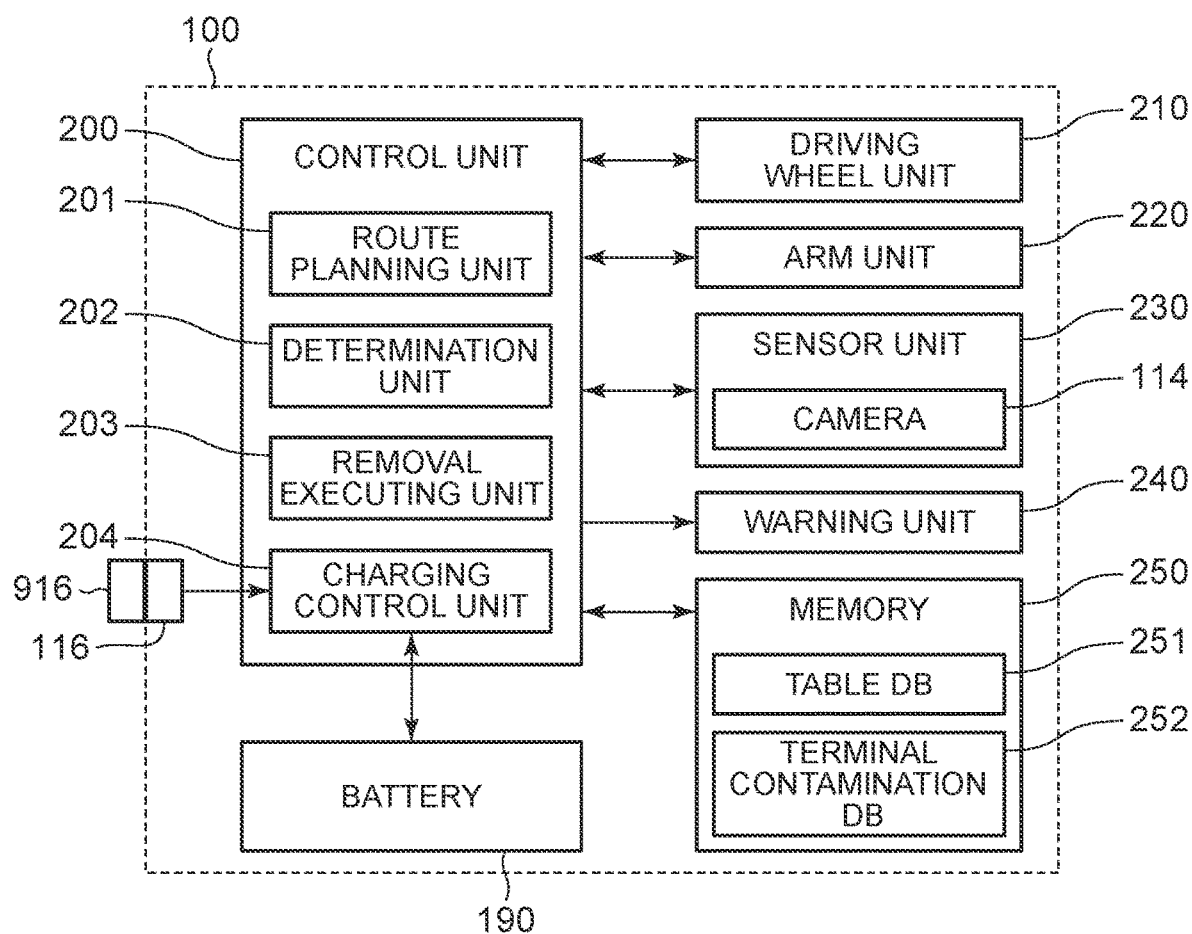
FIG. 2 is a control block diagram of the mobile robot.

FIG. 2 is a control block diagram of the mobile robot 100. A control unit 200 is, for example, a central processing unit (CPU) and is disposed in the carriage 110. A driving wheel unit 210 includes a driving circuit or a motor for driving the driving wheels 112 and is disposed in the carriage 110. The control unit 200 performs rotation control of the driving wheels 112 by sending a drive signal to the driving wheel unit 210.

An arm unit 220 includes driving circuits or motors for driving the arms 121, 122, and 123 and the hand 124 and is disposed in the gripper 120. The control unit 200 performs posture control or gripping control of the gripper 120 by sending a drive signal to the arm unit 220.

A sensor unit 230 includes various sensors for searching a surrounding environment or monitoring the posture of the gripper 120 and is distributed to the carriage 110 and the gripper 120. The control unit 200 drives various sensors and acquires outputs thereof by sending a control signal to the sensor unit 230. The camera 114 is included in the sensor unit 230 and performs an imaging operation in accordance with the control signal.

A warning unit 240 includes, for example, a speaker or an LED and notifies a user that an abnormality occurs by sound or light when an abnormality occurs in the mobile robot 100. The warning unit 240 notifies the user even when an appropriate charging process cannot be performed as will be described later. The control unit 200 issues a warning by sending a warning generation signal to the warning unit 240. The warning unit 240 includes a communication unit such as a wireless LAN and may be configured to transmit a warning to a terminal of the user.

A memory 250 is a nonvolatile storage medium and, for example, a solid state drive is used. The memory 250 stores various parameter values, functions, lookup tables, and the like which are used for control in addition to a control program for controlling the mobile robot 100. The memory 250 includes a table DB 251 which is a database for storing various tables which will be described later and a terminal contamination DB 252 which is a database for storing image data or parameter values used for image analysis of a terminal contamination which will be described later.

The control unit 200 also serves as a functional operation unit that performs various operations associated with control by transmitting and receiving information to and from the driving wheel unit 210, the arm unit 220, the sensor unit 230, the warning unit 240, and the memory 250. A route planning unit 201 plans a route in which the mobile robot 100 moves autonomously to a target position using an environment map. The route planning unit 201 also plans a route in which the mobile robot 100 moves to the power-supply terminals 916 to perform a charging process. A determination unit 202 analyzes the image data acquired by imaging the power-supply terminals 916 using the camera 114 and determines whether to remove contamination of the power-supply terminals 916.

A removal executing unit 203 transmits a control signal to the arm unit 220 and the like to execute a removal operation when it is determined that the contamination of the power-supply terminals 916 should be removed. A charging control unit 204 receives power supplied from the power-supply terminals 916 via the power-receiving terminals 116 and charges the battery 190. At this time, the charging control unit 204 monitors contact resistance between the terminals or a state of charge of the battery 190 and controls start and stop of supply of power. Specific control or operations thereof will be described later.

Figure 3:
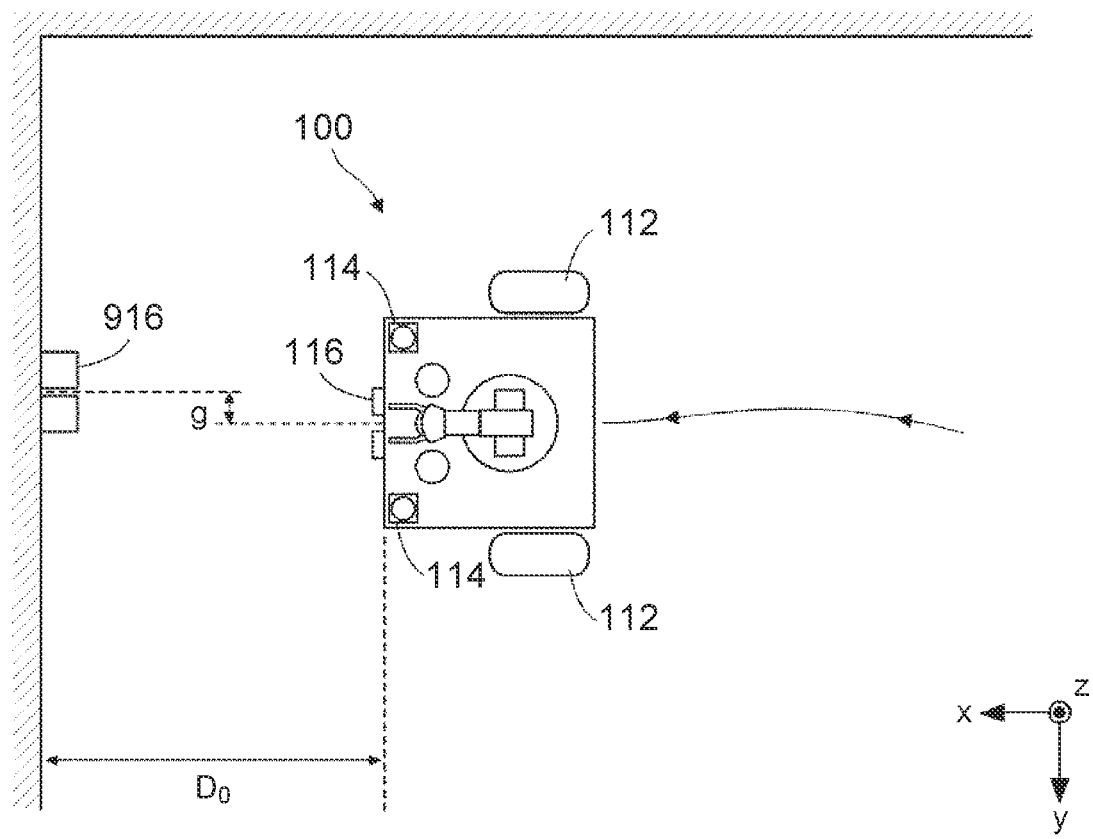
FIG. 3 is a bird's-eye view illustrating a state in which the mobile robot reaches a prescribed position.

FIG. 3 is a bird's-eye view illustrating a state in which the mobile robot 100 reaches a prescribed position. When it is determined that the state of charge of the battery 190 decreases and charging is required, the mobile robot 100 performing a charging operation. The charging operation is started by causing the route planning unit 201 to move the mobile robot 100 to the prescribed position.

The prescribed position is prescribed at a position separated from the power-supply terminals 916 by more than a distance at which the power-receiving terminals 116 can be supplied with power from the power-supply terminals 916. Specifically, the prescribed position is determined to be a position at which the camera 114 can include the whole power-supply terminals 916 in a viewing angle thereof. The camera 114 functions as an imaging unit that images the power-supply terminals 916 at the position separated from the power-supply terminals 916 by more than a distance at which the power-receiving terminals 116 can be supplied with power from the power-supply terminals 916. The prescribed position is preferably a position at which the power-receiving terminals 116 and the power-supply terminals 916 face each other, but is determined with a predetermined span in view of traveling control of autonomous movement. That is, the prescribed position may be a certain position within a prescribed range.

The route planning unit 201 plans a route with a posture facing the power-supply terminals 916 as a target at a position separated by a reference distance $D_0$ from a wall surface on which the power-supply terminals 916 are installed. When the result of movement along the route is within the prescribed range, the charging operation continues to be performed. FIG. 3 is a diagram illustrating a state in which the mobile robot 100 stops with a degree of lateral misalignment g by which the center of the power-receiving terminals 116 is displaced from the center of the power-supply terminals 916 as the result of movement along the planned route.

The control unit 200 can recognize a relative position of the power-supply terminals 916 to the mobile robot 100 from the parallax images acquired from two cameras 114. The control unit 200 catches the position of the power-supply terminals 916 from the environment map, correlates a local coordinate system (the xyz coordinate system in the drawing) determined with respect to the traveling direction of the mobile robot 100 with a global coordinate system of the environment map, and controls the driving wheels 112 or the gripper 120.

The determination unit 202 catches a contamination state of the power-supply terminals by analyzing the acquired image of the power-supply terminals 916. Then, the determination unit 202 determines whether to remove contamination attached to the surface of the power-supply terminals 916 in consideration of the contamination state and the position of the power-receiving terminals 116 relative to the power-supply terminals 916. When the determination unit 202 determines that the contamination of the power-supply terminals 916 should be removed, the removal executing unit 203 executes removal of the contamination.

Figure 4:
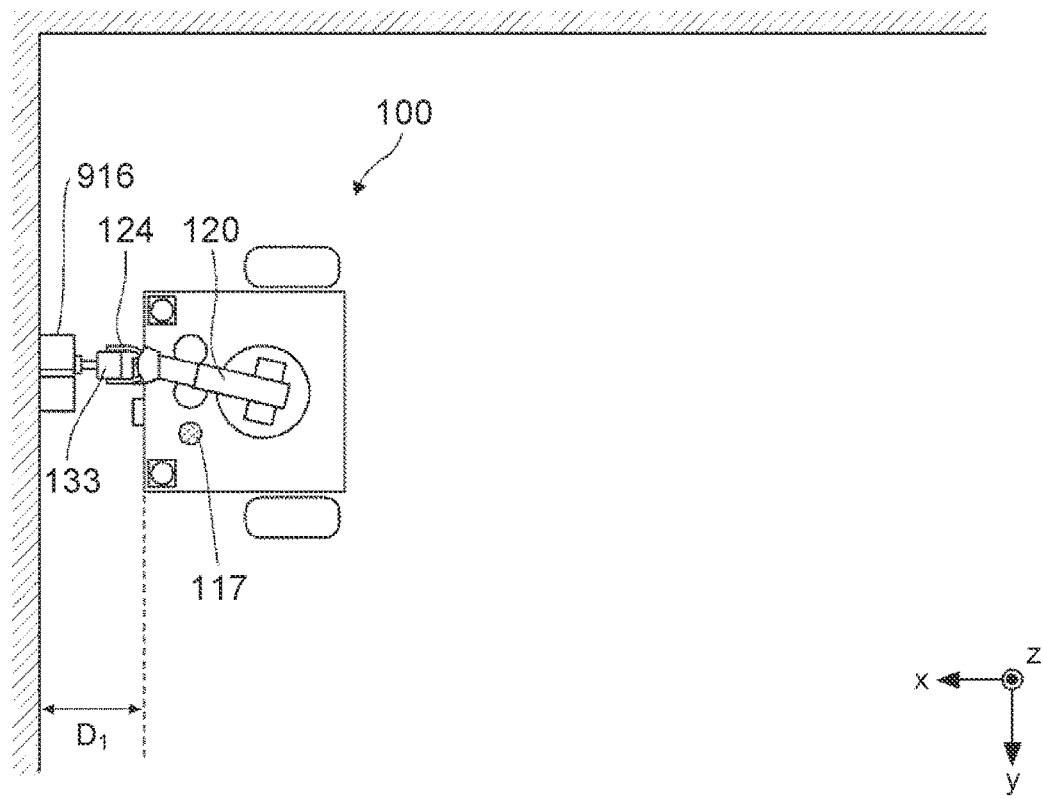
FIG. 4 is a bird's-eye view illustrating a state in which the mobile robot removes contamination of a power-supply terminal.

FIG. 4 is a bird's-eye view illustrating a state in which the mobile robot 100 removes contamination of the power-supply terminals 916. The determination unit 202 specifies a type of the contamination of the power-supply terminals by analyzing the acquired images and transmits the specified type of the contamination to the removal executing unit 203. The removal executing unit 203 selects an appropriate removal tool among the removal tools depending on the type of the contamination, transmits a drive signal to the arm unit 220, causes the hand 124 to grip the selected removal tool, operates the arms 121, 122, and 123, and executes removal of the contamination. For example, as illustrated in the drawing, the removal executing unit 203 transmits a drive signal to the arm unit 220 such that the gripper 120 pulls out the wiper 133 from the storage hole 117 and sweeps the surface of the power-supply terminals 916 with the wiper 133 as a whole operation.

The removal executing unit 203 transmits a drive signal to the driving wheel unit 210 so as to approach the power-supply terminals 916 up to a position at which removal of contamination can be executed. The position at which contamination of the power-supply terminals 916 can be removed is set to a position separated a reference distance $D_1$ from the wall surface based on the operation range of the gripper 120 and the selectable removal tools. Accordingly, when the determination unit 202 determines that the contamination should be removed, the mobile robot 100 moves from the position of the distance $D_0$ illustrated in FIG. 3 to the position of the distance $D_1$ illustrated in FIG. 4.

Figure 5:
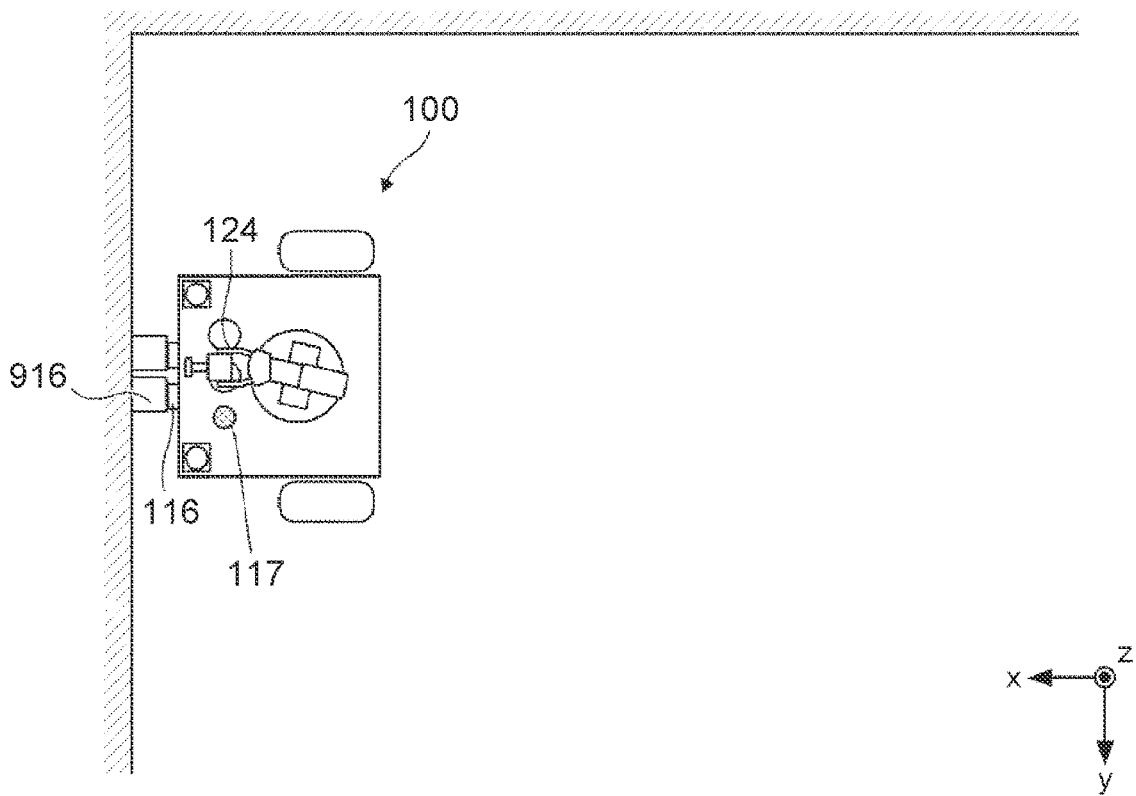
FIG. 5 is a bird's-eye view illustrating a state in which a power-receiving terminal of the mobile robot is brought into contact with the power-supply terminal.

FIG. 5 is a bird's-eye view illustrating a state in which the power-receiving terminals 116 of the mobile robot 100 are brought into contact with the power-supply terminals 916. When the removal executing unit 203 completes the contamination removing operation illustrated in FIG. 4 or when the determination unit 202 determines that the contamination should not be removed at the prescribed position illustrated in FIG. 3, the mobile robot 100 approaches the wall surface and brings the power-receiving terminals 116 into contact with the power-supply terminals 916. The charging control unit 204 ascertains that the power-receiving terminals 116 are brought into contact with the power-supply terminals 916, and starts a charging process of the battery 190. The control unit 200 separates the hand 124 away from the wall surface and stores the removal tool in the storage hole 117 such that the removal tool does not interfere with the charging process.

Figures 6, 7:
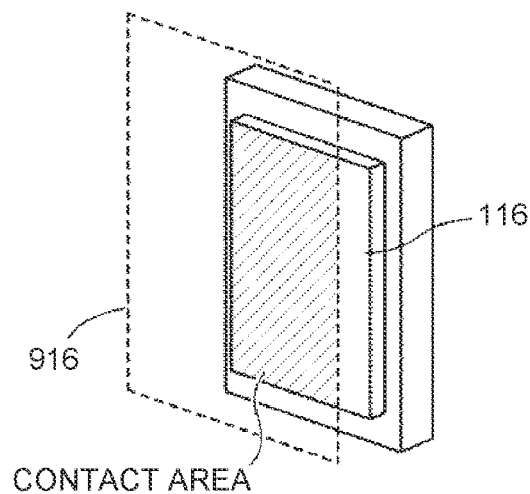
FIG. 6 is a diagram illustrating a state in which the power-supply terminal and the power-receiving terminal are brought into contact with each other.
FIG. 7 is a table illustrating a predicted contact proportion of the power-supply terminal and the power-receiving terminal.

FIG. 6 is a diagram illustrating state in which the power-supply terminals 916 and the power-receiving terminals 116 are brought into contact with each other. It is preferable that the whole surface of the power-receiving terminals 116 be brought into contact with the surface of the power-supply terminal 916 in view of a charging efficiency. However, since the mobile robot 100 approaches the power-supply terminals 916 by autonomous movement, it is difficult to realize such a state every time. That is, a deviation of an arrival position may occur in a route plan to the power-supply terminals 916 due to slip of the driving wheels 112 over a traveling surface, the direction of the caster 113 at a movement start position, a relative relationship between the movement start position and the position of the power-supply terminals 916, and the like. When a deviation of an arrival position occurs, the power-supply terminals 916 and the power-receiving terminals 116 come into contact with each other with misalignment. That is, as illustrated in FIG. 6, the whole power-receiving terminals 116 are not brought into contact with the power-supply terminals 916, but a partial contact area is brought into contact.

When the contact area decreases, contact resistance increases and efficient charging cannot be performed. When contamination is present on the power-supply terminals 916, the contact resistance further increases. In other words, whether to perform efficient charging can be determined by a combination of the size of the contact area and the contamination state.

The mobile robot 100 autonomously moves from the prescribed position illustrated in FIG. 3 to the contact position illustrated in FIG. 5 regardless of whether to execute a contamination removing operation on the way. A ratio of the contact area to the whole surface of the power-receiving terminal 116 can be predicted by simulating such autonomous movement or by repeatedly performing experiment in advance. Even when the movement start position of the mobile robot 100 is misaligned from the assumed prescribed position, the ratio of the contact area when movement is started from the misaligned position can be predicted.

FIG. 7 is an example of a table indicating a predicted contact proportion between the power-supply terminals 916 and the power-receiving terminals 116, which is prepared by simulation or experiment in advance. The table is stored in a table DB 251 and is appropriately referred to by the determination unit 202. The prescribed position is an opposite position separated a distance $D_0$ from the power-supply terminals 916 as described above, and the table two-dimensionally shows the predicted contact proportions for each of the degrees of lateral misalignment g from the prescribed position and the degrees of misalignment in straight forward distance.

The degrees of lateral misalignment g are segmented into four ranges of 0 mm to 5 mm, 5 mm to 10 mm, 10 mm to 15 mm, and 15 mm to 20 mm. The degrees of misalignment in straight forward distance are segmented into four ranges of $D_0$–20 mm to $D_0$–10 mm, $D_0$–10 mm to $D_0$+10 mm, $D_0$+10 mm to $D_0$+20 mm, and $D_0$+20 mm to $D_0$+30 mm. For example, when the movement start position is included in a range in which the degree of lateral misalignment g ranges from 0 mm to 5 mm and the degrees of misalignment in straight forward distance ranges from $D_0$–10 mm to $D_0$+10 mm, the predicted contact proportion is 90%. That is, this means that an expected value of the contact proportion when movement is started from the range is 90%. This range includes the prescribed position, but the predicted contact proportion decreases as the movement start position is separated away from the range.

In this embodiment, when the predicted contact proportion is equal to or less than 60%, it is determined that appropriate charging cannot be performed regardless of the contamination state between the terminals. That is, in FIG. 7, when the movement start position is included in hatched cells, it is determined that appropriate charging cannot be performed without waiting for the analysis result of the contamination state. In other words, when the movement start position is included in a cell in which the predicted contact proportion is greater than 60%, it is determined that efficient charging is possible depending on the contamination state of the terminals.

Figure 8A:
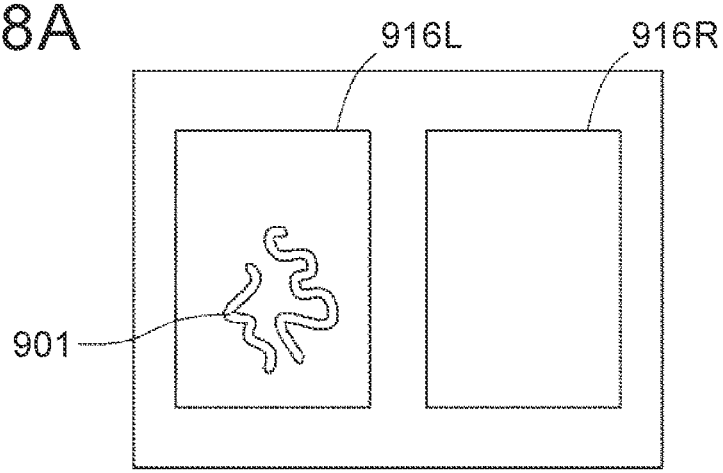
FIG. 8A is a diagram schematically illustrating an image acquired by imaging the power-supply terminal with a camera.
Figure 8B:
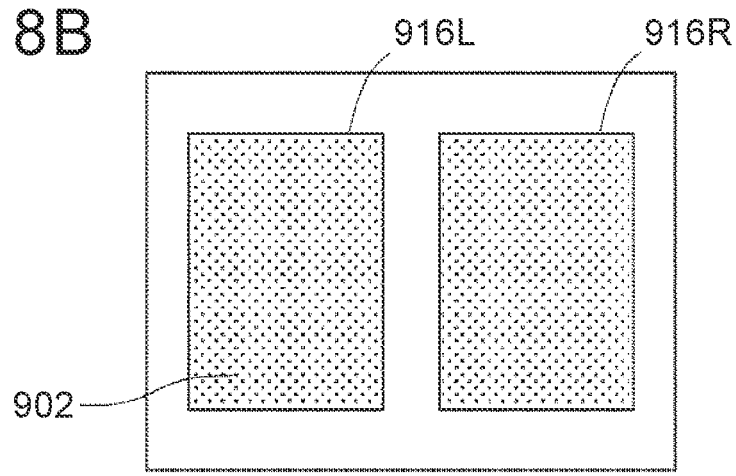
FIG. 8B is a diagram schematically illustrating an image acquired by imaging the power-supply terminal with a camera.
Figure 8C:
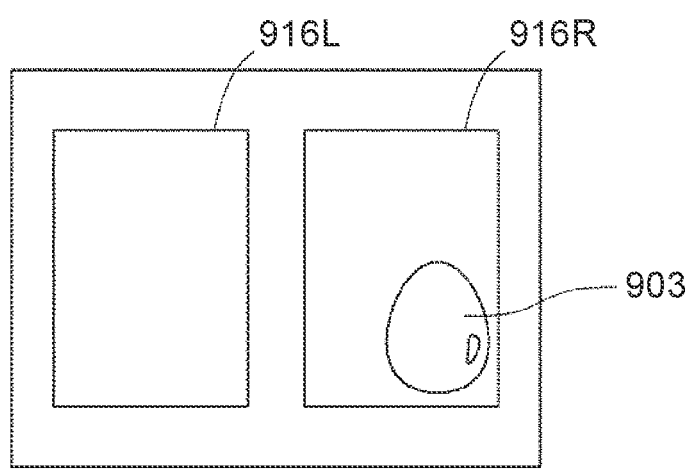
FIG. 8C is a diagram schematically illustrating an image acquired by imaging the power-supply terminal with a camera.

The contamination state of the power-supply terminals 916 will be described below. FIGS. 8A to 8C are diagrams schematically illustrating images obtained by imaging the power-supply terminals 916 with the camera 114. The power-supply terminals 916 include a right terminal 916R and a left terminal 916L, and an image captured by the camera 114 includes images of the right terminal 916R and the left terminal 916L.

FIG. 8A illustrates a state in which dust 901 is attached to the left terminal 916L. The determination unit 202 performs an edge extracting process on the acquired image, recognizes the dust 901, and calculates a dust occupancy rate which is a ratio of the area of the dust 901 to the area of the left terminal 916L. When the dust occupancy rate is greater and the power-supply terminals 916 and the power-receiving terminals 116 are brought into contact with each other, the contact resistance is large and the charging efficiency is low. Therefore, when the determination unit 202 determines that the dust 901 as contamination should be removed, the removal executing unit 203 selects the blower 131 as a removal tool and performs a removal operation of blowing off the dust 901.

FIG. 8B illustrates a state in which an oxide film 902 is formed on the surfaces of the right terminal 916R and the left terminal 916L. The determination unit 202 compares the acquired image with a reference image stored in the terminal contamination DB 252 and determines a degree of oxidization progress of the oxide film 902. The degree of oxidization progress is determined with respect to an increase in contact resistance, and the degree of oxidization progress is determined to be 1%, for example, when the contact resistance value increases by 1%. The reference image is an image of a sample terminal which is imaged in advance for every oxidization progress. When oxidization progresses, the contact resistance increases with progress of oxidization and thus the charging efficiency decreases. Therefore, when the determination unit 202 determines that the oxidization film 902 should be removed, the removal executing unit 203 selects the sander 132 as a removal tool and performs a removal operation of sweeping off the oxidization film 902.

FIG. 8C illustrates a state in which a water droplet 903 is attached to the surface of the right terminal 916R. The determination unit 202 extracts an area in which a chroma is changed from the acquired image and determines whether a water droplet is attached. A water droplet is spread when it is pressed. Accordingly, when the power-supply terminals 916 and the power-receiving terminals 116 are brought into contact with each other as it were, the right terminal 916R and the left terminal 916L may be shorted. Therefore, when the determination unit 202 finds out attachment of the water droplet 903 as contamination, the removal executing unit 203 selects the wiper 133 as a removal tool and performs a removal operation of wiping out the water droplet 903.

Three types of contaminations are described above, but the contamination of the terminals is not limited thereto. Another contamination may be determined and a removal operation may be performed with a removal tool corresponding to the determined contamination. When contamination is complex, suitable removal operations may be sequentially performed. The acquired image can be acquired from one camera 114, but when an image is acquired from two cameras 114, stereoscopic information or the like may be used to determine a type of contamination.

An evaluation function which is used for the determination unit 202 to determine whether to remove contamination of the power-supply terminals 916 will be described below. Evaluation of dust will be first described. FIG. 9 is a table showing a dust coefficient which is obtained by digitizing an influence of dust to charging.

The influence of dust to determination is reflected by taking a dust coefficient into the evaluation function. Specifically, a coefficient $k_1$ is defined depending on a dust occupancy rate which is a ratio of the area of dust to the area of the power-supply terminals 916. For example, as illustrated in the drawing, $k_1=1.0$ is set when the dust occupancy rate ranges from 0% to 2%, and $k_1=0.5$ is set when the dust occupancy rate is greater than 15%. By applying the dust coefficient $k_1$ as evaluation of dust, the influence is reflected in the degree of decrease in charging efficiency in the evaluation function.

FIG. 10 is a table showing an oxidization coefficient which is obtained by digitizing an influence of oxidization to charging. The influence of oxidization to determination is reflected by taking an oxidization coefficient into the evaluation function, similarly to the dust coefficient. Specifically, a coefficient $k_2$ is defined depending on a degree of oxidization progress. For example, as illustrated in the drawing, $k_2=1.0$ is set when the degree of oxidization progress ranges from 0% to 5%, and $k_2=0.5$ is set when the degree of oxidization progress is greater than 15%. By applying the oxidization coefficient $k_2$ as evaluation of dust, the influence is reflected in the degree of decrease in charging efficiency in the evaluation function.

When attachment of a water droplet is found out, a removal operation is performed without taking it into the evaluation function. When the type of contamination is dust and an oxide film, it is evaluated whether to perform a removal operation using an evaluation function in consideration of the above-mentioned coefficient and the evaluation of the movement start position which has been described above with reference to FIG. 7. Specifically, for example, an evaluated value V=coefficient $k_1$×coefficient $k_2$×predicted contact proportion (%) is established. The determination unit 202 determines that a removal operation should be performed when the evaluated value V is less than a reference value $V_s$ (for example, 60), and determines that a removal operation should not be performed when the evaluated value is equal to or greater than the reference value $V_s$. The predicted contact proportion is a type of information on predicted misalignment between the power-supply terminals 916 and the power-receiving terminals 116, and the value decreases as the predicted misalignment increases. Accordingly, it can be said that as the predicted misalignment increases, the likelihood that a removal operation will be performed increases. When other types of contamination are to be evaluated, the number of coefficients to be multiplied may be increased by defining coefficients k3, k4, . . . for the contaminations. A flow of the whole charging process using such an evaluated value will be described below.

Figure 11:
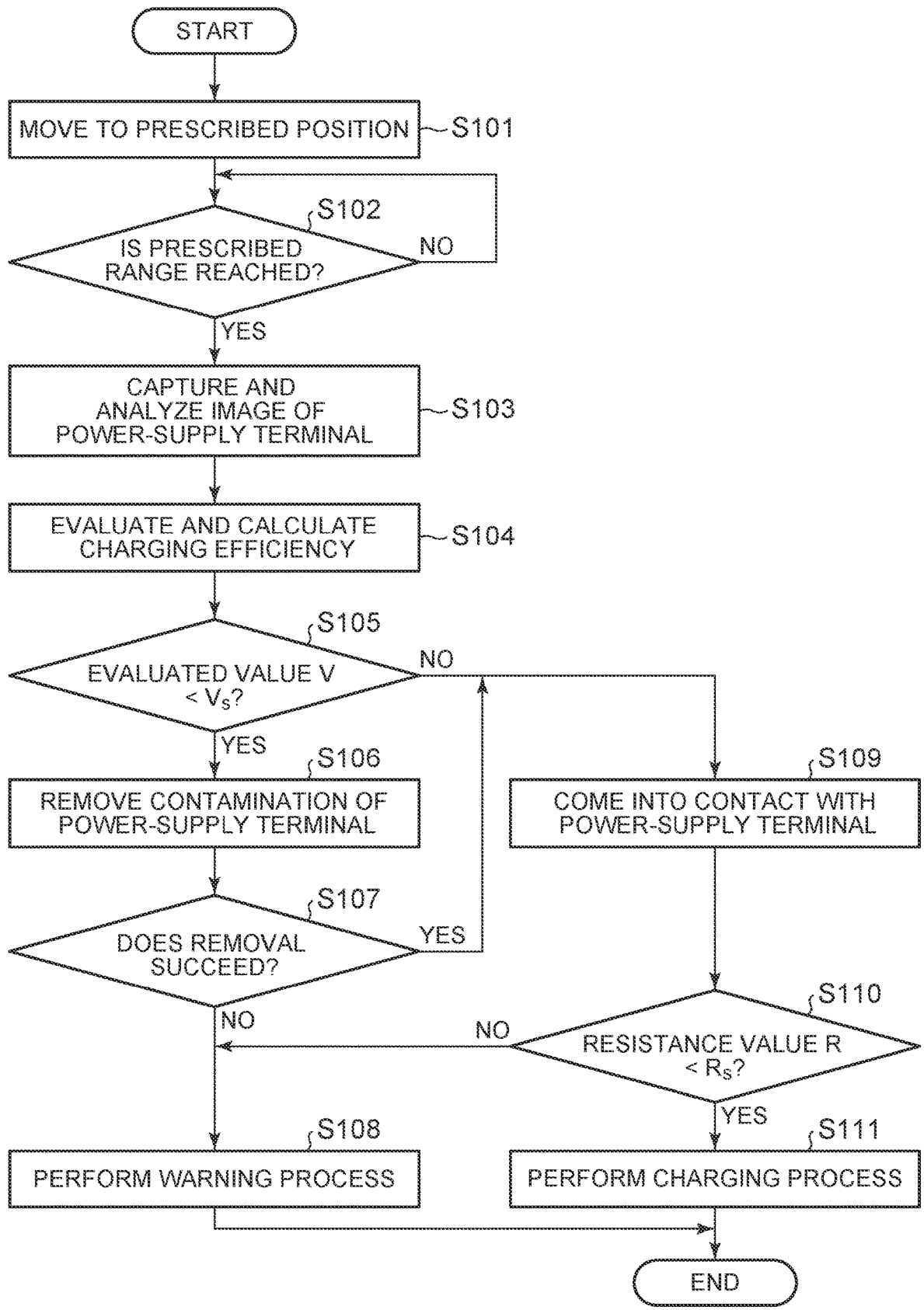
FIG. 11 is a flowchart illustrating a charging routine of the mobile robot.

FIG. 11 is a flowchart illustrating a flow of a charging process of the mobile robot 100. This flow is started at a time point at which the control unit 200 determines that it is necessary to charge the battery 190. A control program describing the flow is stored in the memory 250 and the control unit 200 reads and executes the control program from the memory 250.

In Step S101, the route planning unit 201 plans a route from a current position to the prescribed position described above with reference to FIG. 3, and moves the mobile robot 100 along the route by transmitting a drive signal to the driving wheel unit 210.

In Step S102, the determination unit 202 calculates a current position from an image acquired using the camera 114. The determination unit 202 reads the table of the predicted contact proportion illustrated in FIG. 7 from the table DB and determines whether the current position of the mobile robot 100 belongs to a range including cells in which the predicted contact proportion is greater than 60% in the table with reference to the read table. When the current position does not belong to the range, efficient charging cannot be expected regardless of the contamination state of the power-supply terminals 916 and thus approach to the prescribed position is performed again (NO in Step S102). When the current position belongs to the range, the process of Step S103 is performed.

In Step S103, the determination unit 202 images the power-supply terminals 916 and analyzes the acquired image. The determination unit 202 determines the contamination state of the power-supply terminals 916 through the image analysis, and determines a type of contamination when there is the contamination. In Step S104, the determination unit 202 calculates the above-mentioned evaluated value by evaluating and calculating a charging efficiency. In Step S105, the determination unit 202 determines whether the calculated evaluated value V is less than the reference value $V_s$. The process of step S106 is performed when it is determined that the calculated evaluated value is less than the reference value, and the process of Step S109 is performed otherwise. When the analyzed type of the contamination is such a type of contamination with which a removal operation is performed regardless of the evaluated value such as a water droplet, the process of Step S106 is performed without calculating the evaluated value.

In Step S106, the determination unit 202 sends information on the type of the contamination to the removal executing unit 203, and the removal executing unit 203 selects a removal tool corresponding to the type of the contamination and removes the contamination of the power-supply terminals 916. When the removal operation is completed, the determination unit 202 images the power-supply terminals 916 again using the camera 114 and determines whether removal of the contamination succeeds in Step S107. The process of S109 is performed when it is determined that the removal succeeds, and the process of Step S108 is performed otherwise.

In Step S108, the control unit 200 determines that the charging process cannot be appropriately performed, sends a warning generation signal to the warning unit 240 to notify a user of the intent, and ends the series of processes. When a user instructs restart, the process of Step S109 may be subsequently performed regardless of presence or absence of contamination.

When it is determined in step S105 that the evaluated value V is not less than the reference value $V_s$ and when it is determined in Step S107 that removal of the contamination of the power-supply terminals 916 succeeds, the control unit 200 moves the mobile robot 100 and brings the power-receiving terminals 116 in contact with the power-supply terminals 916 in Step S109. When the contact is completed, the charging control unit 204 determines whether the contact resistance value between the power-receiving terminals 116 and the power-supply terminals 916 is less than the reference value $R_s$ in Step S110. When it is determined that the contact resistance value R is less than the reference value $R_s$, the charging control unit 204 performs the charging process in Step S111. When charging is completed, the series of processes is ended. On the other hand, when it is determined in Step S110 that the contact resistance value R is equal to or greater than the reference value $R_s$, the above-mentioned warning process is performed in Step S108 and the series of processes is ended.

In the above-mentioned flow, it is determined whether the removal succeeds by performing the contamination removing operation once, but the removal operation may be repeatedly performed up to a predetermined number of times even when the removal fails. In this case, the mobile robot 100 may be returned to the prescribed position to perform evaluation and calculation again.

In the above-mentioned embodiment, the table of the predicted contact proportion is employed as the information on misalignment between the power-supply terminals 916 and the power-receiving terminals 116 which is predicted when the mobile robot moves to the position separated from the power-supply terminals 916 by the distance at which the power-receiving terminals 116 can be supplied with power from the power-supply terminals 916. However, the information on misalignment is not limited thereto, but a variety of information may be employed. In this case, the evaluation function can be appropriately corrected depending on the employed information.

In the above-mentioned embodiment, supply of power is carried out by contact of the power-receiving terminals 116 with the power-supply terminals 916, but the above-mentioned embodiment can also be applied to a non-contact type charging system. In the non-contact type charging system, for example, when contamination is present between a power-supply-side coil and a power-receiving-side coil, a power supply efficiency also decreases. Accordingly, it is preferable to remove the contamination if necessary.

What is claimed is:

1. An autonomous mobile object comprising:
    a moving mechanism that is used for the autonomous mobile object to move autonomously;
    a power-receiving terminal that is supplied with power from a power-supply terminal located outside the autonomous mobile object;
    an imaging unit configured to image the power-supply terminal at a position separated from the power-supply terminal by more than a distance at which the power-receiving terminal is capable of being supplied with power from the power-supply terminal;
    a determination unit configured to determine whether to remove contamination of the power-supply terminal based on an analysis result obtained by analyzing the image captured by the imaging unit and information on misalignment between the power-supply terminal and the power-receiving terminal, the misalignment being predicted when the autonomous mobile object moves to a position at which the power-receiving terminal is capable of being supplied with power from the power-supply terminal using the moving mechanism; and a removal unit configured to remove the contamination when the determination unit determines to remove the contamination.

2. The autonomous mobile object according to claim 1, wherein the determination unit is configured to perform the determination using an evaluation function of increasing a likelihood of determination to remove the contamination as the misalignment between the power-supply terminal and the power-receiving terminal increases.

3. The autonomous mobile object according to claim 1, wherein the determination unit specifies a type of the contamination based on the image, and the removal unit is configured to change a tool that is used to remove the contamination depending on the type specified by the determination unit.

4. The autonomous mobile object according to claim 1, further comprising:

a robot hand configured to grip a work object of work that is performed by the autonomous mobile object, the robot hand being used as at least a part of the removal unit to remove the contamination.

5. The autonomous mobile object according to claim 1, wherein the information on the misalignment is stored in a storage unit as a database indicating a predicted contact proportion between the power-supply terminal and the power-receiving terminal, the database being prepared depending on a relative position of the autonomous mobile object to the power-supply terminal.

6. The autonomous mobile object according to claim 1, wherein the determination unit is configured to determine whether to remove the contamination of the power-supply terminal based on a predicted contact proportion between the power-supply terminal and the power-receiving terminal that is extracted from the information on the misalignment and a degree of deterioration in power supply efficiency due to the contamination that is analyzed from the image.

7. The autonomous mobile object according to claim 1, further comprising:

a warning unit configured to issue a warning to a user when power supply work performed after the removal unit removes the contamination fails.

8. The autonomous mobile object according to claim 1, wherein the imaging unit is a part of an environment sensor that acquires surrounding environment information for autonomous movement.

9. A non-transitory computer-readable storage medium for an autonomous mobile object, the storage medium storing a computer program and causing a computer to perform, when the computer program is executed:

an imaging step of imaging a power-supply terminal located outside the autonomous mobile object in a state in which a power-receiving terminal that is supplied with power from the power-supply terminal is at a position separated from the power-supply terminal by more than a distance at which the power-receiving terminal is capable of being supplied with power from the power-supply terminal;

an analysis step of analyzing the image captured in the imaging step;

a calculation step of calculating an amount of misalignment between the power-supply terminal and the power-receiving terminal, the misalignment being predicted when the autonomous mobile object moves to a position at which the power-receiving terminal is capable of being supplied with power from the power-supply terminal;

a determination step of determining whether to remove contamination of the power-supply terminal based on an analysis result in the analysis step and the amount of misalignment calculated in the calculation step; and a removal step of removing the contamination when removing the contamination is determined in the determination step.

\* \* \* \* \*